Figure 1:
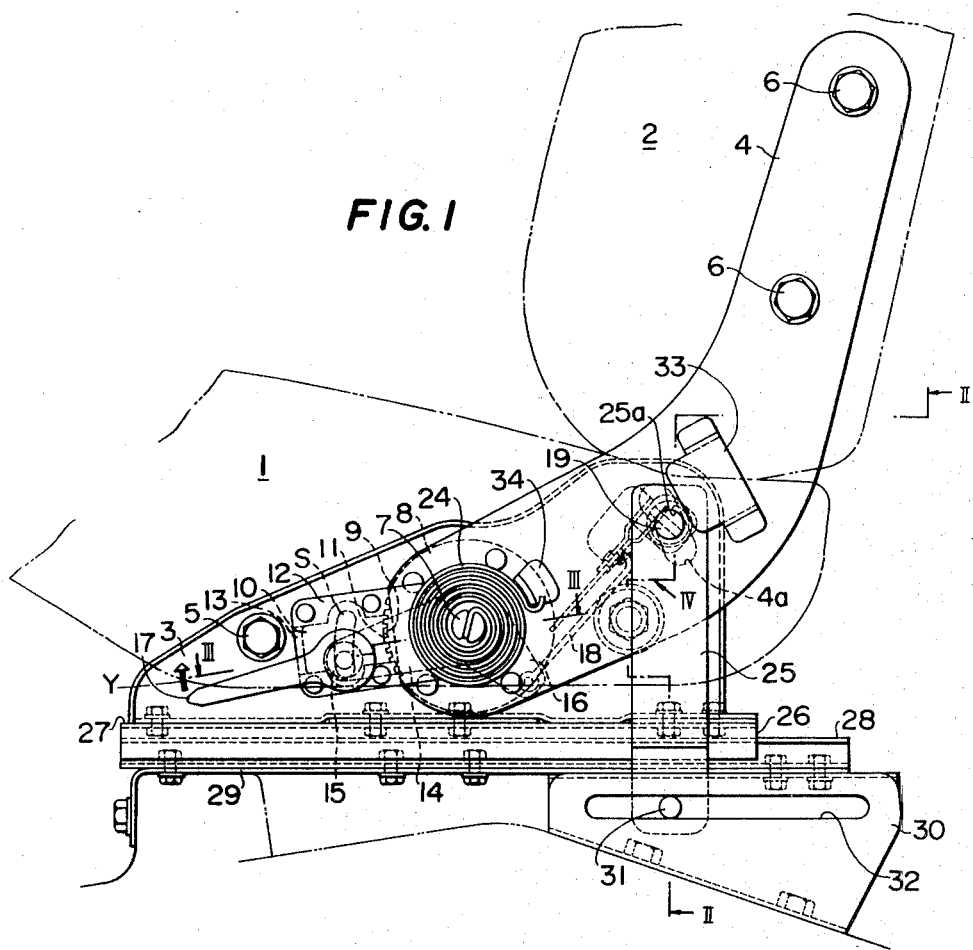

United States Patent [19]
Iida et al.

[11] 3,829,156
[45] Aug. 13, 1974

[54] RECLINING SEAT

[75] Inventors: Teiji Iida; Noboru Yoshimura, both of Toyota, Japan

[73] Assignee: Toyota Jidosha Kogyo Kabushiki Kaisha, Aichi-ken, Japan

[22] Filed: Sept. 28, 1972

[21] Appl. No.: 292,889

[30] Foreign Application Priority Data
Sept. 30, 1971 Japan.................................. 46-76493

[52] U.S. Cl................................ 297/216, 297/379
[51] Int. Cl............................................. B60r 21/10
[58] Field of Search........... 297/379, 363, 364, 367, 297/216; 248/429, 430

[56] References Cited
UNITED STATES PATENTS

| | | | |
|---|---|---|---|
| 2,624,613 | 1/1953 | Parmely | 297/216 |
| 3,028,199 | 4/1962 | Beierbach | 297/379 |
| 3,186,760 | 6/1965 | Lohr | 297/216 |
| 3,286,971 | 11/1966 | Walter | 248/429 |
| 3,362,748 | 1/1968 | Carter | 248/429 X |
| 3,385,628 | 5/1968 | Lahaie | 297/379 |
| 3,469,812 | 9/1969 | Wonell | 248/430 |

FOREIGN PATENTS OR APPLICATIONS

1,163,170   2/1964   Germany ........................... 297/367

*Primary Examiner*—Francis K. Zugel
*Attorney, Agent, or Firm*—Stevens, Davis, Miller & Mosher

[57] ABSTRACT

The present invention relates to a reclining device for a seat-back and to a reclining seat having an improved seat mounting to a vehicle. An elongated bore is formed in a seat-back frame, having a bore length corresponding to an amount of angle of inclination of the seat-back frame, and a pin is formed on a seat cushion frame, for mating with and disengaging from said elongated bore. Formed in a seat track bracket is an elongated bore having a length corresponding to an amount of back and forth sliding movement of the seat, with which bore a pin mate which is fitted into a seat track holding plate fixed to an upper rail of the seat track.

The present reclining seat permits free adjustment of angle of inclination of the seat-back, affords simple construction and sufficient anti-collision strength bringing improved safety of the passenger.

1 Claim, 4 Drawing Figures

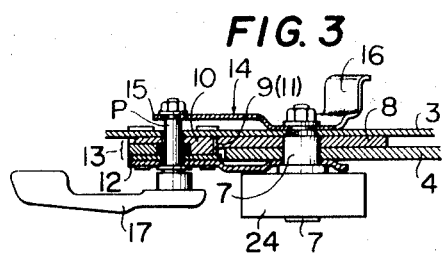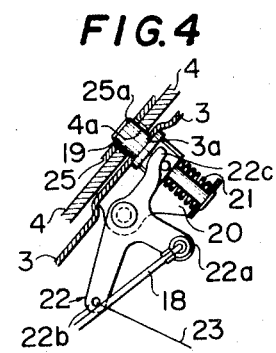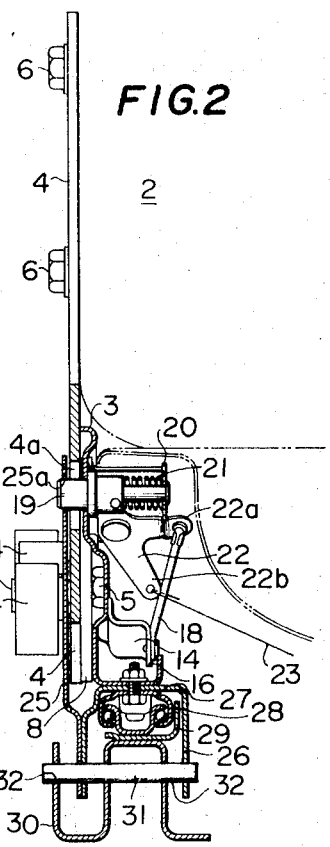

RECLINING SEAT

The present invention relates to a reclining seat with an improved reclining device for a seat-back and an improved structure for mounting a seat to a vehicle, and it aims to provide a reclining seat which enables free adjustment of the angle of inclination of the seat-back, which is simple in construction and gives increased safety for passengers.

In the prior art reclining seat, when two vehicles collide head-on or vehicle collides from the back of another vehicle or a vehicle collides against some obstacle and as a result when big forward impact load is applied to a front seat at the time of secondary collision between the passengers occuping a rear seat and a front seat-back and/or when the passengers occupying the front seat are thrown forwardly, the reclining device or the coupling mechanism between the seat and the seat track cannot withstand a big forward impact load applied to the seat through a seat-belt, resulting in breakage of coupling members in the reclining device and/or departure of an upper rail of the seat track from a lower rail, which in turn causes the front seat to incline forwardly. As a result, there exists a great risk in that the passengers in the rear seat would be thrown over the front seat to collide against a front window glass, an instrument panel, etc and would be injured seriously by such a secondary collision.

According to the present invention as defined by the appended claims, a risk of injury of the passengers through the secondary collision due to the breakage of coupling members as occured in the prior art device is substantially reduced by providing means for preventing the forward inclination of the seat-back in excess of a predetermined angle even when the reclining device is broken and means for preventing the departure of the seat track, whereby increased safety for the passengers are insured.

The present invention will now be described in more detail with reference to the accompanying drawings in which;

FIG. 1 is a front view of a reclining seat in accordance with the present invention, FIG. 2 is a sectional view taken on a line II—II of FIG. 1, FIG. 3 is a sectional view taken on a line III—III of FIG. 1, and FIG. 4 is a fragmentary sectional view taken from the direction shown by an arrow IV of FIG. 1.

Now referring to FIGS. 1 through 4, on opposite sides of each of a seat cushion 1 and a seat-back 2, a pair of seat cushion frames 3, and a pair of seat-back frames 4 are integrally mounted by bolts and nuts 5 and 6, and the seat-back frames 4 are pivotably mounted to shafts 7 formed on the seat cushion frames.

On the seat-back frames 4, a disc-like adjustable toothed plate 8 having a number of teeth 9 formed at a constant pitch is affixed by rivets or the like concentrically with the shaft 7 which is a center of inclination motion for the seat-back 2.

On one end of a stop toothed plate 10, there are formed teeth 11 adapted to mesh with a portion of the teeth 9 of said adjustable toothed plate 8. Also formed in the stop toothed plate 10 is an arcuate slit (S), in cooperation with a pin (P) projecting at the tip end of a first arm 15 of a handle lever 14 having a first and second arms 15 and 16 which are fitted into the shaft 7, slidably moves forward and back along a guide channel 13 in a casing 12 between a position at which it meshes with the teeth 9 and a position spaced from the teeth 9 at which it is released. On the first arm 15 of the handle lever 14 an adjustable handle 17 is mounted, and on the tip end of the second arm 16 an actuating rod 18 is pivotably mounted for actuating an emergency pin 19 which is described later.

The emergency pin 19 is, as shown in FIGS. 2 and 4, mounted so that it may be projected or retracted by the casing 20 and a bore 3a of the seat cushion frame 3 and it is normally biased toward its projecting position by a coil spring 21 provided at the bottom of the pin 19. A release lever 22 is pivotably mounted on the casing 20 of the pin 19 and it includes first, second and third arms 22a through 22c. Pivotably mounted to the first arm 22a is the other end of the actuating rod 18 journaled to the second arm 16 of the handle lever 14, and mounted to the second arm 22b is a wire 23 for simultaneous operation of release levers on the opposite side (not shown), and the third arm 22c is so constructed as to enable retraction of the emergency pin 19. In the projecting position, the tip end of the emergency pin 19 engages into an elongated bore 4a formed in the seat-back frame 4. The elongated bore 4a is so dimensioned that the engagement between the elongated bore 4a and the emergency pin 19 is always assured even when adjustable angle of the seat-back varies.

FIG. 2 shows a sectional view of the seat track in which the seat cushion frames 3 are bent in L-shaped cross-section at their lower ends and they are fixed by a seat track holding plate 26 of inverted U-shaped cross section and an upper rail 27 of the seat track, and bolts and nuts. A lower rail 28 is affixed by bolts and nuts to a seat track bracket 30 fixed to a floor of the vehicle through a lock plate 29.

On opposite sides of the seat track holding plate 26 a pin 31 extending through both sides is inserted, the pin 31 engaging in an elongated bore 32 in the seat track bracket 30 fixedly mounted to a body of the vehicle. The pin 31 and the emergency pin 19 have at their upper ends bores 25a for engaging the emergency pin 19 and fixed at their lower ends to one side of the seat track holding plate 26, and they are interconnected by an auxiliary plate 25 through which the pin 31 is inserted. The elongated bore 32 of the seat track bracket 30 has a length corresponding to an amount of slide of the seat.

A cover plate 33 is fixed on the seat-back plates 4 for preventing displacement of the auxiliary plate 25.

A spiral spring 24 is mounted at the end of the shaft 7 for normally biasing the seat-back 2 forwardly. An inner end of the spring 24 is fixed to the shaft 7 while an outer end thereof is hooked to a hook 34 formed on the seat-back frame 4.

With the construction of the present invention as described above, when the adjustable handle 17 is actuated in the direction shown by an arrow Y, the stop toothed plate 10 slides along the guide channel 13 in the casing 12 (to the left in the drawing) by the action of the arcuate slit (S) formed in the stop toothed plate 10 and the pin (P) projecting from the first arm 15 of the handle lever 14. As a result, the mesh of the teeth 11 formed at one end of the stop toothed plate 10 with the teeth 9 of the adjustable toothed plate 8 is released.

At the same time, through the operation of the actuating rod 18 having its opposite end journaled to the second arm 16 of the handle lever 14 and the first arm 22a of the release lever 22, the release lever 22 is rotated clockwise as viewed in FIG. 4. Thus, the emergency pin 19 is caused to be moved axially (to the right as viewed in FIG. 4) by the third arm 22c of the release lever 22 and the engagement thereof with the bore 25a of the auxiliary plate 25 and the elongated bore 4a of the seat-back frame 4 is released. Thus, the seat-back frame 4 is pivotable about the shaft 7 and the seat-back 2 is ready to be adjusted for its angle of inclination freely.

In the position of FIG. 1 (where the seat-back 2 is set to an angle of inclination), when the collision of vehicles occurs, the passengers in the rear seat are thrown away to collide against the seat-back 2 (secondary collision) and hence the front seat is applied with a very big forward impact force. The impact force is conveyed through the seat-back frame 4, through the meshed portion of the teeth 9 of the adjustable toothed plate 8 with the teeth 11 of the stop toothed plate 10, the emergency pin 19, the auxiliary plate 25, the pin 31, the seat track bracket 30, to the car-body. Even if the meshed portion is broken through the impact force and the seat-back tends to be inclined forwardly, the seat-back 2 stops its inclination motion at a position where one end of the elongated bore 4a of the seat-back frame 4 engages the emergency pin 19.

By selecting a shearing force applied at this moment to the emergency pin 19 through the elongated bore 4a, within a range of allowable stress, a required strength may be obtainable.

In the embodiment illustrated, the shaft 7 is positioned at a lower point than in the prior art device, and care has been paid to make the lever ratio as large as possible in order to reduce the force applied to the emergency pin 19.

As stated above, the forward impact force applied to the seat-back 2 is conveyed to the car-body through the emergency pin 19, the auxiliary plate 25, the pin 31, the seat track bracket 30 in this order and is not applied directly to the upper rail 27 of the seat track so that the breakage of the seat track or the departure of the upper rail 28 from the lower rail 27 is positively prevented.

In the seat-back 2 of the present invention, the adjustment of the angle of inclination required during normal drive operation may be made nearly infinitely as has been possible in the prior art device.

The construction and the operation of the present invention have been fully described. In the first aspect of the present invention, in case of the vehicle-to-vehicle collision or vehicle-to-obstacle collision, even when the passengers in the rear seat collide against the seat-back 2 of the front seat (secondary collision) and the reclining mechanism is fuly broken by the impact force, the displacement of the seat-back 2 can be restricted by the positive engagement of the end of the elongated bore 4a of the seat-back frame 4 with the emergency pin 19, and the impact energy of the rear seat passengers may be absorbed by the displacement of the seat-back 2 itself. Thus, the rear seat passengers are protected from being thrown toward the front seat to make secondary collision with the elements in the car room.

Furthermore, when a very big impact force is exerted on the seat-back 2, the seat track section in the prior art device has been completely taken out of the floor because the reclining section was not directly coupled with the seat track section. However, according to the second aspect of the present invention, the reclining section and the seat track section are integrally coupled, and the seat track holding plate 26 fixed to the reclining section and the seat track bracket 30 fixed to the car body are engaged through the pin 31 so that the seat track does not depart from the floor and the reclining seat can positively maintain its attitude.

Since the lower end of the auxiliary plate 25 which at its upper end engages with the emergency pin 19 has one side of the seat track holding plate 26 affixed thereto and the lower end thereof engages the pin 31, a stronger structure is provided through the coupling of the reclining section to the seat track section, insuring increased safety of the reclining seat upon application of the impact force.

Additionally, the reclining seat of the present invention can be constructed with the reduced number of components, makes it easy to adjust the angle of inclination and assures reliable operation and protection of the passengers with simple construction.

What is claimed is:

1. A reclining seat comprising:
a seat-back having a frame,
a seat cushion having a frame,
said seat-back being connected to said seat cushion through a reclining device so that said seat-back may be angularly adjusted relative to said seat cushion,
said seat being slidable back and forth on a seat track connected thereto,
an elongated bore in the seat-back frame,
an emergency pin connected to the seat cushion frame and engageable with and disengageable from said elongated bore in said seat-back frame in response to the actuation of the reclining device,
an auxiliary plate having at its upper end a bore for engaging said emergency pin,
a seat track holding plate fixed at its upper end to the lower end of said seat cushion frame,
said auxiliary plate at its lower end being attached to said seat track holding plate,
a second pin extending into the lower portion of said seat track holding plate and into the lower portion of said auxiliary plate,
a seat track bracket connected to the lower side of the seat track, said bracket being attachable to the body of a vehicle, and
an elongated bore in said seat track bracket, said second pin also extending into said elongated bore in said seat track bracket.

* * * * *